UNITED STATES PATENT OFFICE.

MAX KUGEL, OF WIESDORF, NEAR COLOGNE, GERMANY, ASSIGNOR TO FARBENFABRIKEN OF ELBERFELD CO., OF NEW YORK, N. Y., A CORPORATION OF NEW YORK.

ANTHRACENE DERIVATIVES AND PROCESS OF MAKING SAME.

SPECIFICATION forming part of Letters Patent No. 722,719, dated March 17, 1903.

Application filed December 6, 1902. Serial No. 134,125. (No specimens.)

*To all whom it may concern:*

Be it known that I, MAX KUGEL, doctor of philosophy, chemist, residing at Wiesdorf, near Cologne, Germany, (assignor to the FARBENFABRIKEN, OF ELBERFELD CO., of New York,) have invented a new and useful Improvement in New Anthracene Derivatives and Process of Making Same; and I hereby declare the following to be a clear and exact description of my invention.

My invention relates to the manufacture of new derivatives of the anthracene series by causing oxidizing agents to act on such alpha-alphylamidoanthraquinones and derivatives thereof as contain a hydroxy group in ortho position to the alphylamido group. I believe from my researches that the bodies thus produced are most probably oxazin derivatives. From this point of view the production of the new derivative obtained from 1-phenylamido-2-oxyanthraquinone, for instance, probably takes place according to the following equation:

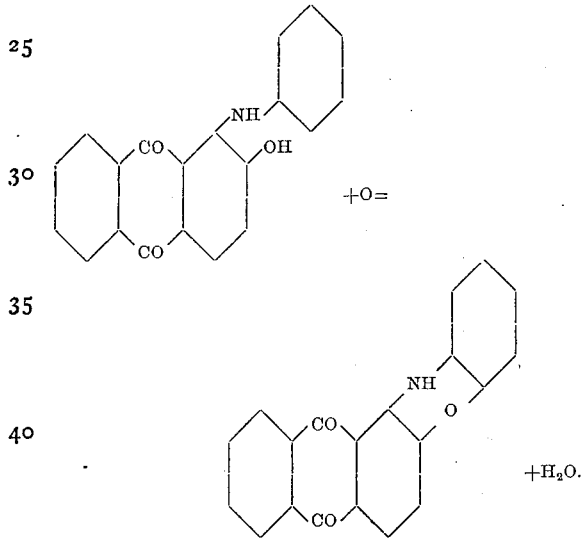

The oxidation can be carried out by means of the usual oxidizing agents, such as manganese dioxid, chromic acid, fuming sulfuric acid, nitro compounds, lead peroxid, mercuric oxid, or the like.

The above-mentioned ortho-oxy-alpha-alphylamidoanthraquinones can be prepared, for instance, on replacing the nitro group in the corresponding alpha-nitro-ortho-hydroxy compounds by the alphylamido group. This replacement can be effected by condensation of the said nitro-hydroxy compounds with aromatic amins.

The new derivatives are crystalline compounds soluble in pyridin, producing from violet to greenish-blue solutions.

In carrying out my new process practically I can proceed as follows, the parts being by weight: ten parts of 1-paratolylamido-2-4-dioxyanthraquinone, obtainable by condensing alpha-nitroxanthopurpurin with para-toludin, and having the following formula:

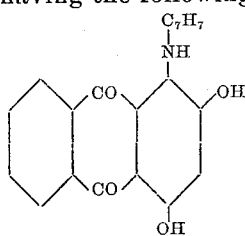

are stirred into two hundred parts of glacial acetic acid. To this solution, heated to boiling, a ten-per-cent. aqueous solution of chromic acid is slowly added until the bluish-red color of the mass has turned pure blue. After cooling the new product is filtered off and crystallized from anilin. The new product thus obtained represents dark brilliant needles soluble in hot glacial acetic acid and readily soluble in boiling pyridin with a pure-blue color, being soluble in concentrated sulfuric acid with a bluish-green color and insoluble in caustic-soda lye.

Analogous results are obtained on using other oxidizing agents or other of the above-mentioned alpha-alphylamidoanthraquinones containing a hydroxy group in ortho position to the alphylamido group or derivatives thereof, such as 1-anilido-2-oxyanthraquinone, 1-anilido-2-oxy-3-nitroanthraquinone, 1-anilido-2-4-dioxyanthraquinone, 1-5-dianilido-2-4-6-8-tetraoxyanthraquinone or the like.

Having now described my invention and in what manner the same is to be performed, what I claim as new, and desire to secure by Letters Patent, is—

1. The process for producing the herein-described new anthracene derivatives, which process consists in first treating with oxidizing agents alpha-alphylamidoanthraquinones containing a hydroxy group in alpha position to the alphylamido group, or derivatives thereof, and then isolating the resulting products from the reaction mixture, substantially as hereinbefore described.

2. The process for producing the herein-described new anthracene derivative, which process consists in first treating 1-paratolyl-amido-2-4-dioxyanthraquinone with an aqueous solution of chromic acid, and then isolating the resulting product from the reaction mass, substantially as hereinbefore described.

3. The herein-described new derivatives of the anthracene series, which are crystalline compounds soluble in pyridin producing from violet to greenish-blue solutions, substantially as hereinbefore described.

4. The herein-described new derivatives of the anthracene series, obtainable by oxidation of 1-paratolylamido-2-4-dioxyanthraquinone, which represents, when in a pure state, dark brilliant needles, soluble in hot glacial acetic acid and readily soluble in boiling pyridin with a pure blue color, being dissolved by concentrated sulfuric acid yielding a bluish-green solution and insoluble in caustic-soda lye, substantially as hereinbefore described.

In testimony whereof I have signed my name in the presence of two subscribing witnesses.

MAX KUGEL.

Witnesses:
OTTO KÖNIG,
J. A. RITTERSHAUS.